Figure 5:
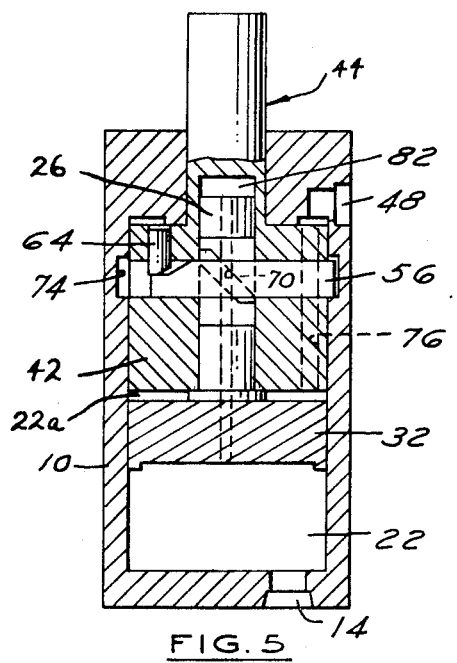
Figure 6:
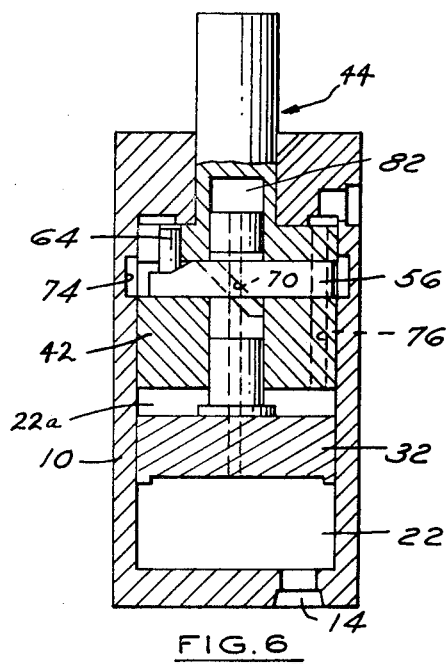

United States Patent
Jahnke

[11] 3,736,844
[45] June 5, 1973

[54] LINEAR ACTUATOR WITH LOCKING MEANS

[75] Inventor: William R. Jahnke, Rochester, Mich.

[73] Assignee: KMS Industries, Inc., Ann Arbor, Mich.

[22] Filed: Apr. 29, 1971

[21] Appl. No.: 138,434

[52] U.S. Cl. .......................92/24, 92/27, 74/110
[51] Int. Cl. ................................F15b 15/26
[58] Field of Search...................92/15, 23, 24, 27, 92/28; 74/110

[56] References Cited

UNITED STATES PATENTS

| | | | |
|---|---|---|---|
| 3,429,233 | 2/1969 | Wright | 92/24 |
| 3,150,569 | 9/1964 | Attermeyer | 92/28 X |
| 2,811,951 | 11/1957 | Bodem et al. | 92/14 |
| 3,326,090 | 6/1967 | Cruse | 92/24 |
| 2,326,138 | 8/1943 | Grant, Jr. | 74/110 |
| 2,395,223 | 2/1946 | Ingres | 74/110 X |
| 2,536,141 | 1/1951 | Rockwell | 74/110 |

Primary Examiner—Martin P. Schwadron
Assistant Examiner—Abe Hershkovitz
Attorney—Barnes, Kisselle, Raisch & Choate

[57] ABSTRACT

A linear actuator, lock, and release mechanisms for coupling the rod of a power cylinder to an actuatable member subject to secondary forces such as a die or a core of an injection molding machine. The combination includes a piston-cylinder power system incorporating a cross-block movable by a camming force into a locking recess in a power cylinder wall, and a release mechanism utilizing the cross-block to mechanically exert a high breakaway force on the actuatable member upon the initiation of a retraction motion.

13 Claims, 8 Drawing Figures

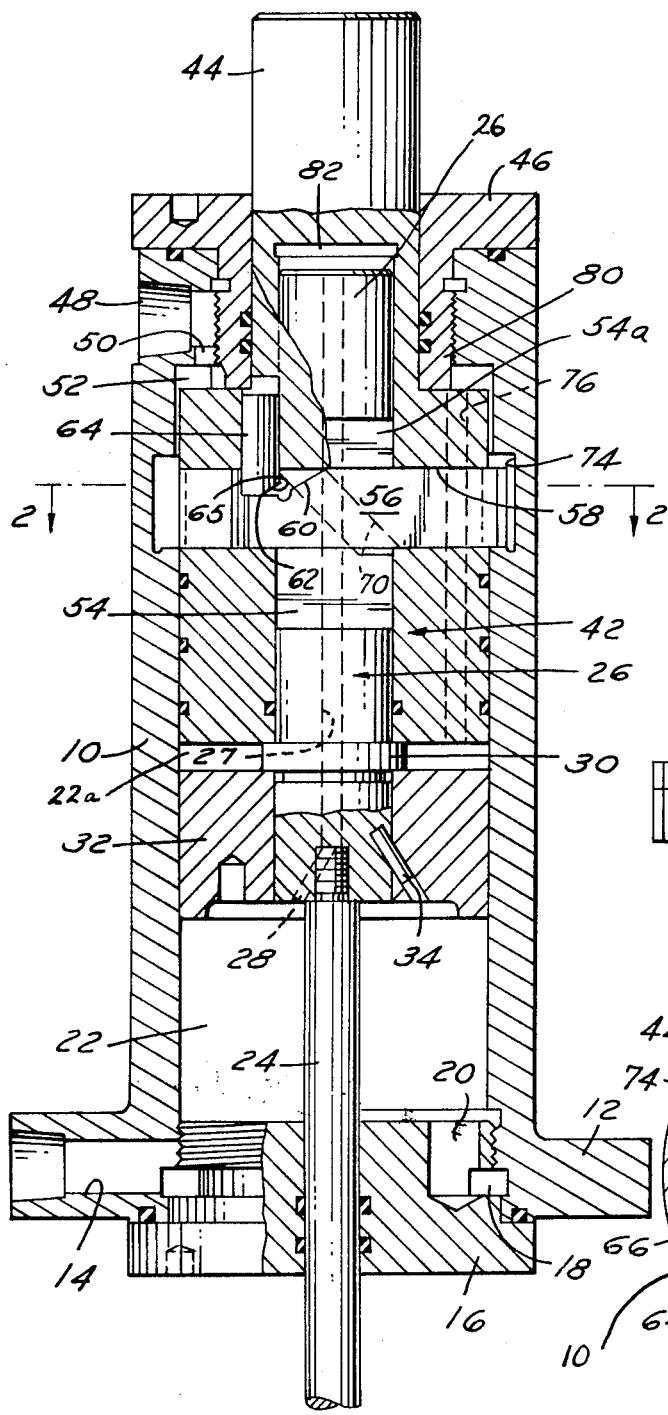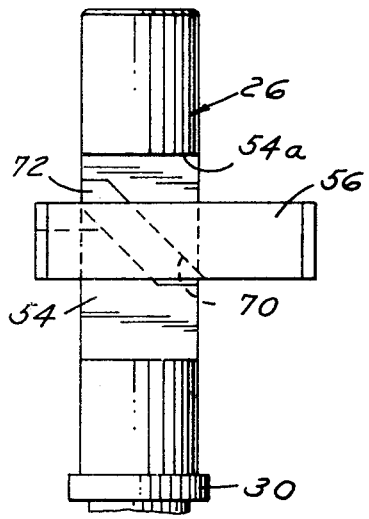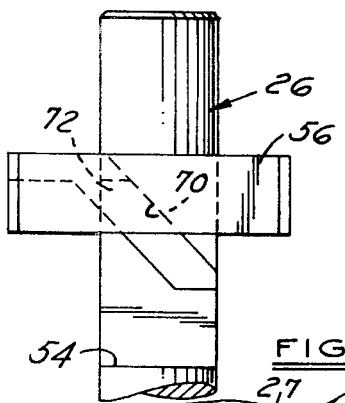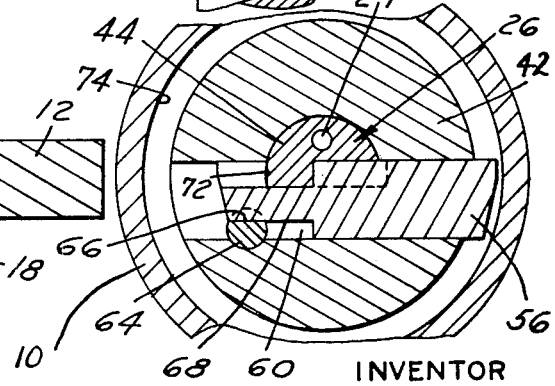
PATENTED JUN 5 1973
3,736,844
SHEET 1 OF 2
INVENTOR
WILLIAM J. JAHNKE
BY
Barnes, Kisselle, Raisch & Choate
ATTORNEYS

INVENTOR
*WILLIAM J. JAHNKE*

BY

*Barnes, Kisselle, Raisch & Choate*

ATTORNEYS

LINEAR ACTUATOR WITH LOCKING MEANS

This invention relates to a self-locking actuating arrangement and more particularly to an arrangement for coupling a driven member to a driving member which moves linearly between a pair of spaced positions with locking means on the driven member automatically activated to lock the driven member in one of its positions. Reference is made to a U. S. Pat. to Frank D'Ascenzo, Jr., No. 3,534,621, issued Oct. 20, 1970, wherein a device for a similar purpose is disclosed.

An object of the present invention is to provide an improved locking means which is compactly arranged within a cylinder.

A further object of the invention is the provision of a locking device for a projectible pin, such as a mold core, which incorporates a breakaway mechanism in combination with the locking means to facilitate application of sufficient force for breakaway followed by a withdrawal action.

Another object of the invention is the provision of a device which can be actuated by fluid pressure when desired and also mechanically actuated when necessary.

The present invention eliminates the necessity for a wedge lock actuator and utilizes a sliding latch mechanism which provides a positive locking arrangement.

Other objects and features of the invention will be apparent in the following description and claims wherein the principles of operation are said further together with the best mode presently contemplated for the invention.

Drawings accompany the disclosure and the various views thereof may be briefly described as:

FIG. 1, a sectional view of the assembly showing the relationship of the parts.

FIG. 2, a sectional view on line 2—2 of FIG. 1.

FIGS. 3 and 4, views of basic parts of FIG. 1 in differing positions.

FIGS. 5, 6, 7, and 8, diagrammatic views illustrating the relationship of the parts in various positions.

Referring to the drawings:

The assembly shown in FIG. 1 comprises a basic cylinder 10 having a base flange 12 drilled at 14 to provide a fluid pressure inlet. The bottom end of the cylinder is closed by a threaded plug 16 which has a suitable annular recess 18 and passage 20 to permit pressure to flow from opening 14 to an interior chamber 22. Through the plug 16 extends a piston rod 24 with suitable sealing relationship and on the top of this piston rod in threaded engagement therewith is a cylindrical shaft 26 having an axially extending bore 27 therein which is connected to a cross passage 28 to the cylinder interior 22.

The shaft 26 has a flange 30 spaced upwardly from its bottom end and below this flange, surrounding the shaft, is an annular piston 32 which is suitably locked to the shaft by one or more keys 34. Above the flange 30 is a second piston 42 which in its lower portion is annular in that it fits around the top portion of the shaft 26. The top of the piston 42 has a cylindrical projection 44 which extends out of the cylinder 10 through a top end plug 46 having a suitable sealing relation with the cylinder and with the extension 44. An opening 48 at the top of the cylinder serves as a fluid inlet leading through a passage 50 to a chamber 52 at the top portion of the cylinder above the piston 42. It will be appreciated that the piston 42 has a sliding relationship with the top portion of the shaft 26.

The shaft 26 has a side recess 54 with a flat chordal base which accommodates cross block 56 having a sliding relationship in a recess 58 in the top piston 42. The cross block at the left-hand end, as shown in FIG. 1, has an angled surface 60 which terminates in a horizontal surface 62, these cooperating with a cylindrical plug 64 vertically mounted in piston 42 and having a flat portion 66 bearing against a recessed surface 68 on the cross block (FIG. 2).

On the other side of the cross block 56 there is a 45° angle slot 70 shown in FIGS. 3 and 4 cooperating with an angled projection cam 72 on the chordal base of shaft 26. Recess 68 and surfaces 60, 62 are omitted from FIGS. 3 and 4 to allow a clear showing of cam 72 and slot 70. With this arrangement, relative vertical movement between the cross block 56 and the shaft 26 will cause a shifting of the lock block transversely of the shaft (see FIGS. 3 and 4). It will be noted also that internally of the cylinder 10 there is a recess 74 which can be annular to receive the end of the cross block 56 when projected as shown in FIG. 1. A fluid passage 76, shown in dotted lines in FIG. 1, passes through the piston 42 connecting recess 52 to recess 22a above the piston 32.

With the device as described, when pressure fluid is injected into the chamber 22 of cylinder 10 through the opening 14, the piston 32 will be driven upwardly along with the shaft 26. This will carry piston 42 upward and cause the projection 44 which, as an example, may be a core pin in a molding system, to be moved upwardly to the position shown in FIGS. 1 and 5. An inner collar 80 on end plug 46 serves as a stop for piston 42. This upward movement of the shaft 26 causes cam 72 to urge the cross block 56 to the right so that the cross block, as it reaches the recess 74 of the cylinder wall, will move into engagement with the recess as viewed in FIGS. 1, 2, 3, and 5. Consequently, any force which is applied to the projection 44, such as might occur in a die cast molding, is absorbed by the metal-to-metal contact between the cross block 56 and the cylinder housing so that there is no possibility of a retraction movement of the projection 44.

It will be noted that chamber 22 is connected through passage 28 and axial bore 27 to a chamber 82 at the top of the shaft 26. This allows fluid to pass to and from chamber 82.

Figure 7:
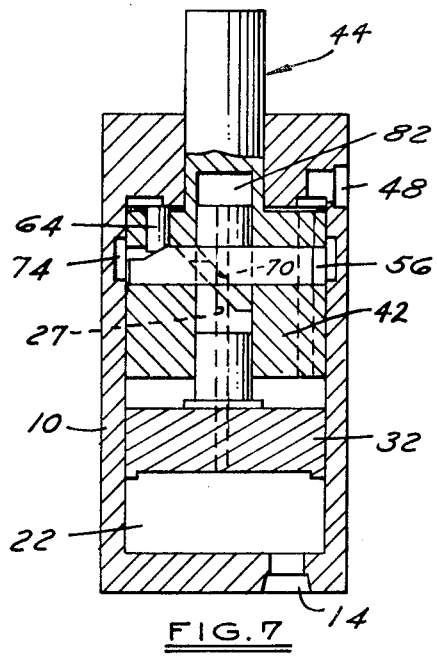
Figure 8:
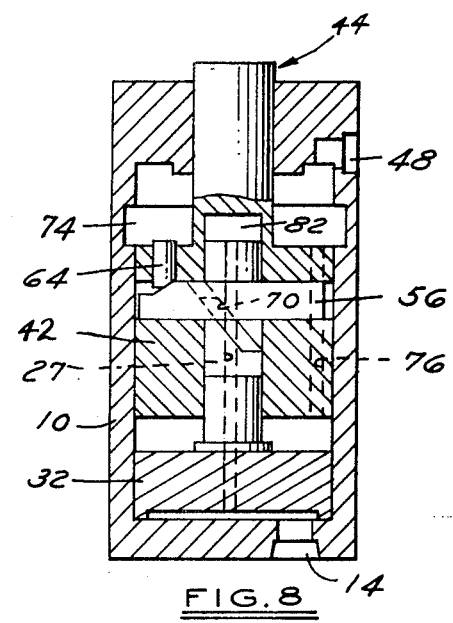

Assuming that the device is being used in a die casting mold and the core (projection 44) is ready for retraction, fluid can be introduced through the port 48 and passage 50 to the chamber 52 at the top of cylinder 42. This pressure fluid will flow through the passage 76 in piston 42 where it will be exposed to the top of the piston 32 causing the piston to move downwardly relative to the piston 42, pressing the shaft 26 also downwardly. The 45° cam relationship between the cross block and the shaft will cause the cross block to move to the left as viewed in FIG. 6, thus disengaging the cross block from the cylinder wall. Further movement of the piston 32 causes the lock block to contact the cam pin 64. The 30° angle of the pin at 65, acting against the 30° surface 60 on the cross block, gives a mechanical advantage of approximately 2 to 1. When pin 64 is forced upwardly by cam 60, it abuts the bottom of the collar 80 and serves as a reacting member so that further motion of the cross block will force the piston 42 downward to release the projection 44 from the core in which it is held (FIG. 7). Further motion of cylinder piston 32 carries the now-released piston 42 and the cross block downward through contact of shaft 26 (top ledge 54a of recess 54) with the cross block and effects full release of the core pin 44 from the high shrink material in the mold in which it is held. Additional movement of the cylinder piston 32 will cause the entire assembly to retract as shown in FIG. 8.

It will thus be seen that in the engaged position of the cross block 56, there is a positive relationship which resists any tendency to move the core pin 44. Secondly, the cross block which does this locking also serves to unlock the core projection 44 by reason of the camming relationship of the 30° angle surface 60 against the reaction pin 64. Thus, a high degree of force can be applied to break the projection 44 loose after which the entire assembly can move downwardly until recycle.

In the initiation of the recycle with the parts as viewed in FIG. 8, pressure below piston 32 will move the piston and the shaft 26 upwardly. Cam 72 on shaft 26 will act in the slot 70 of cross block 56 with a component to the right as viewed in the figures and an upward component. Since the movement of cross block 56 to the right is limited by the cylinder wall, the upward component will be effective to lift the cross block and the piston 42 upwardly until the cross block reaches the lock recess 74, at which time the end of the cross block will enter the recess and block further movement of the assembly. In this stage, the projection 44 will be in its operating position.

The piston rod 24 is positioned eccentrically to the piston shaft 26 and the axial passage 27 to stabilize the moving assembly against rotation. This rod 24 serves as an indicator as to the position of the piston 22. It may be used to actuate an electrical switch if desired.

It will be appreciated that the passage 76 transmits pressure from the top of piston 42 to the top of piston 32 which adds to the surface force of the combined pistons. This greater area, together with the two to one mechanical advantage of the 30° angled surfaces 60–65 on pin and cross block, insures full release of the core pin 44 from the high shrink material in which it is held.

What is claimed as new is as follows:

1. In a device for shifting a projectable member linearly to a projected position and a retracted position, a mechanism to achieve said shifting and to lock said mechanism in the projected position comprising:
    a. a movable body carrying said projectable member,
    b. a housing for guiding said body in a lineal path between a first position and a second position,
    c. a first means in said body movable laterally of said lineal path between a retracted and a projected position to mechanically engage said housing in a projected position,
    d. cam means engageable with said first means upon movement of said first means from a projected position to a retracted position to exert a high retracting force on said body, and
    e. a reaction member movable in said body member in the directions of said lineal path, engageable at one end with a cam surface on said first means and engageable at the other end with a portion of said housing.

2. In a device for shifting a projectable member linearly to a projected position and a retracted position, a mechanism to achieve said shifting and to lock said mechanism in the projected position comprising:
    a. a first piston carrying said projectable member,
    b. a cylinder housing with fluid pressure ports at each end having said first piston slidably received therein for guiding said piston in a lineal path between a first position and a second position,
    c. a first means in said first piston movable laterally of said lineal path between a retracted and a projected position to mechanically engage said cylinder housing in a projected position,
    d. cam means engageable with said first means upon movement of said first means from a projected position to a retracted position to exert a high retracting force on said piston,
    e. a second piston axially displaceable relative to said first piston by fluid pressure, and
    f. a shaft on said second piston projecting into said first piston, said shaft carrying said cam means engageable with said first means to shift it laterally between said projected and retracted positions.

3. A device as defined in claim 2 in which said first means comprises a cross block slidable in said body having a cam slot on one side to engage a cam surface on said shaft, and a cam surface on an opposite side to engage said cam means.

4. A device as defined in claim 3 in which said cam means comprises a reaction plunger movable in said body in the direction of said lineal path, engageable at one end with said cam surface on said cross block and at the other end with a portion of said housing.

5. In a device for shifting a projectable member linearly to a projected position and a retracted position, a mechanism to achieve said shifting, to releasably lock said projectable member and to exert a high breakaway retracting force on said projectable member comprising, a housing adapted to guide the projectable member in a generally lineal path between projected and retracted positions with respect to said housing, driving means for shifting said projectable member to said projected and retracted positions, a first means movable by said driving means to bear on said housing to retain said projectable member in said projected position and to disengage said housing and release said projectable member, and a second means operably connected with said driving means and said projectable member, said second means providing a mechanical advantage such that the total breakaway retracting force exerted on said projectable member is greater than the force produced by said driving means on said projectable member when said projectable member was moved to said projected position by said driving means at least as said projectable member initially moves from said projected position toward said retracted position.

6. A device as defined in claim 5 wherein said housing comprises a cylinder housing and said driving means comprises a fluid actuated piston slidably received in said cylinder housing for generally axial movement between a first position wherein the projectable member is retracted and a second axially spaced position wherein the projectable member is extended.

7. A device as defined in claim 6 wherein said second means comprises cam means.

8. In a device for shifting a projectable member linearly to a projected position and a retracted position, a mechanism to achieve said shifting, to releasably lock said projectable member and to exert a high breakaway retracting force on said projectable member comprising, a cylinder housing, said housing being adapted to guide the projectable member in a generally lineal path between projected and retracted positions with respect to said housing, a fluid actuated first piston slidably received in said cylinder housing for generally axial movement for shifting said projectable member to said projected and retracted positions, a first means movable by said first piston to bear on said housing to retain said projectable member in said projected position and to disengage said housing and release said projectable member, a second means operably connected with said first piston and said projectable member, said second means providing a mechanical advantage greater than unity in exerting a higher breakaway retracting force on said projectable member than the force produced by said first piston, said second means exerting said higher breakaway retracting force at least as said projectable member initially moves from said projected position toward said retracted position, a movable body received in said cylinder housing and carrying said projectable member, and said first means comprises a cross member carried by said body and movable laterally of said lineal path of said body to an extended position to bear on said cylinder housing and to a retracted position to disengage from said cylinder housing.

9. A device as defined in claim 8 in which said second means comprises a reaction member movable in said body generally in the direction of said lineal path thereof, engageable at one end with a cam surface of said first means, and engageable at the other end with a portion of said cylinder housing.

10. A device as defined in claim 8 in which said body has a passage extending generally linearly therein, and which also comprises an actuator shaft on said first piston and slidably received in said passage in said body and cam means on said actuator shaft and said cross member to effect lateral shifting of said cross member in response to relative movement between said actuator shaft and said body.

11. A device as defined in claim 8 in which said cylinder housing has fluid pressure ports at each end, said body comprises a second piston slidable in said cylinder housing and axially displaceable relative to said first piston by fluid under pressure, said body has a passage extending therein in the direction of said lineal path thereof, an actuator shaft on said first piston slidably received in said passage, and cam means on said actuator shaft and said cross member to shift said cross member laterally between retracted and extended positions in response to relative movement between said actuator shaft and said body.

12. A device as defined in claim 11 in which said cam means on said actuator shaft and said cross member comprises a cam slot on said cross member to engage a cam surface on said actuator shaft, and said second means comprises a cam surface on said cross member.

13. A device as defined in claim 12 in which said second means also comprises a reaction plunger movable in said body in the direction of said lineal path, engageable at one end with said cam surface on said cross member and at the other end with a portion of said cylinder housing.

* * * * *

UNITED STATES PATENT OFFICE
CERTIFICATE OF CORRECTION

Patent No. 3,736,844    Dated June 5, 1973

Inventor(s) William R. Jahnke

It is certified that error appears in the above-identified patent and that said Letters Patent are hereby corrected as shown below:

Col. 3, line 62, change "directions" to "direction"

Col. 4, lines 19, 20, cancel "carrying said cam means engageable" and insert in place thereof "being operably connected"

Col. 4, line 24, cancel "on one side"

Col. 4, line 25, cancel "on an opposite side"

Col. 4, line 15, after "said" insert -- first --; line 20, cancel "it" and insert -- said first means --.

Signed and sealed this 26th day of February 1974.

(SEAL)
Attest:

EDWARD M. FLETCHER, JR.
Attesting Officer

C. MARSHALL DANN
Commissioner of Patents